3,654,079
PROCESS FOR PRODUCING L-PHENYLALANINE
BY FERMENTATION
Katsunobu Tanaka, Kazuo Oshima, Yoh Tokoro, and Mitsuyoshi Okii, Tokyo-to, Japan, assignors to Kyowa Hakko Kogyo Kabushiki Kaisha, Tokyo-to, Japan
No Drawing. Filed Mar. 28, 1969, Ser. No. 811,597
Claims priority, application Japan, Mar. 29, 1968, 43/20,030
Int. Cl. C12d 13/06
U.S. Cl. 195—28 R                   3 Claims

ABSTRACT OF THE DISCLOSURE

This invention relates to a process for producing L-phenylalanine by fermentation comprising culturing a hydrocarbon-assimilable and tyrosine-requiring microorganism in a medium which contains hydrocarbon and nitrogen sources and accumulating significant amount of L-phenylalanine in the medium.

BACKGROUND OF INVENTION

L-phenylalanine is important as one of the essential amino acids. Among the known processes for producing L-phenylalanine by fermentation are, for example, the process using a tyrosine-requiring strain of *Escherichia coli* [Experientia, vol. 6, 41 (1950)]; the process using a tyrosine-requiring strain of *Micrococcus glutamicus* [J. Agr. Chem. Soc. Japan, vol. 35, 142 (1961)] etc. However, these known processes commonly use saccharides as raw materials.

It has been desired to change raw materials for producing amino acids from expensive saccharides to cheaper hydrocarbons.

SUMMARY OF INVENTION

It has now been discovered that some mutants which require tyrosine for growth are capable of accumulating a substantial amount of L-phenylalanine in the culture medium wherein readily cheap hydrocarbons serve as the carbon-source.

The mutant strains which may be used for the fermentation of this invention are tyrosine-requiring hydrocarbon-assimilable mutant strains. Such mutant strains can be obtained by UV irradiation of the hydrocarbon-assimilable strains which have already been isolated by the present inventors and associates. Preferred mutant strains for the purpose of this invention can be exemplified a nutrient-requiring mutant strain (2438–U–12) (ATCC 21226) of *Corynebacterium hydrocarboclastus* (ATCC–15592), mutant strain (2411–U–25) of *Arthrobacter paraffineus* (ATCC 15591), that (2473–U–54) of *Brevibacterium ketoglutamicum* (ATCC 15588), that (1661–U–24) of *Arthrobacter roseoparaffinus* (ATCC 15584) etc. The ATCC strain of Example 1 is freely available to the public from the ATCC collection. American Type Culture Collection is located at 12301 Parklawn Drive, Rockville, Md.

The mutant strains are obtained from the foregoing principal strains by conventional mutagenic procedure.

Inorganic salts which may be used for the process of this invention include, for example, potassium hydrogen phosphate, sodium dihydrogen phosphate, magnesium sulfate, ferrous sulfate, zinc sulfate, calcium carbonate etc.

The cultivation is aerobically carried out for example, by shaken-culture, submerged culture etc. at a temperature of 10–75° C. but preferably at a temperature of 25–50° C. It is preferred to maintain the pH of the fermentation liquor at substantially neutral conditions by using a suitable neutralizing agent, for example, such as aqueous amomnia, sodium, hydroxide, ammonium carbonate, calcium carbonate etc.

After culturing for about 2–8 days, preferably 2 to 4 days, it is possible to accumulate a substantial amount of L-phenylalanine in the medium. The time period may of course be varied depending on the yields required. Normal yield of from 3 mg./ml. to 5 mg./ml. are obtained.

After completion of the cultivation, microbial bodies are removed by filtration and the filtrate is treated for example, with a suitable ion exchange resin or by other conventional recovery procedures so as to recover L-phenylalanine.

The following non-limitative examples illustrate the invention. In the examples, the deposited ATCC strains denoted are freely available to public on an unrestricted basis.

Example 1

*Corynebacterium hydrocarboclastus* No. 2438–U–12 (ATCC 21226) (tyrosine-requiring mutant strain) was cultivated with shaking in a yeast bouillon for 24 hours and was used as the seed culture.

The composition of the fermentation medium was as follows, percentages being as weight percent: $KH_2PO_4$ 0.2%, $Na_2HPO_4$ 0.2%, $MgSO_4 \cdot 7H_2O$ 0.1%, $$MnSO_4 \cdot 4H_2O$$

0.005%, $FeSO_4 \cdot 7H_2O$ 0.001%, $ZnSO_4 \cdot 7H_2O$ 0.001%, $NH_4NO_3$ 1%, thiamine 1 mg./l, NZ-amnie 0.5% (casein enzymatic hydrolyzate), n-paraffin mixture ($C_{12}$ to $C_{14}$) 5% (pH 7.0).

After sterilization, wt. 1% of separately sterilized calcium carbonate was added.

The above mentioned yeast bouillon seed culture was inoculated to the fermentation medium at a ratio of wt. 5%. The cultivation was carried at 30° C. for 4 days with shaking. The pH of the medium was adjusted to about neutral by adding ammonium carbonate. 4.5 mg./ml. of L-phenylalanine was accumulated.

After the completion of the fermentation, one liter of the broths was filtered to remove microbial body and the filtrate was adjusted to pH 2. The filtrate was then passed through a resin column packed with Diaion SK #1 (strongly acidic cation exchange resin available from Mitsubishi Kasei Kogyo K.K., Japan). After washing with water, the resin was eluted with 1 N ammonia water.

Ninhidrin-reaction positive fractions of the eluate were collected and concentrated at 40° C. in vacuo. After decolorizing with active charcoal, the concentrate was added with alcohol to give 3.6 g. of crude crystals of L-phenylalanine.

Example 2

*Corynebacterium hydrocarboclastus* No. 2438–U–12 (ATCC 21226) (tyrosin-requiring mutant strain) was used. 0.5% of NZ-amine in the fermentation medium in Example 1 was replaced by 500 γ/ml. of L-tyrosine, and the pure synthetic medium obtained was used. The fermentation conditions were similar to those described in Example 1.

After the completion of the fermentation, 4.1 mg./ml. of L-phenylalanine was determined in the medium. The product was recovered by the procedure of Example 1.

Example 3

Bouillon culture of *Arthrobacter paraffineus* No. 2411–U–25 (tyrosine-requiring mutant strain) was used as seed.

After culture with shaking for 4 days, 2.4 mg./ml. of L-phenylalanine was accumulated.

Example 4

A similar experiment to the described in Example 1 was performed only that *Brevibacterium ketoglutamicum* No. 2473–U–54 (tyrosine-requiring strain) was used to accumulate 4.4 mg./ml. of L-phenylalanine.

What is claimed is:

1. A process for producing L-phenylalanine by fermentation, which comprises culturing *Corynebacterium hydrocarboclastus* (ATCC 21226) in a culture medium containing a nitrogen source and a hydrocarbon as the main carbon source, accumulating L-phenylalanine in the medium, and recovering the L-phenylalanine from the medium.

2. The process of claim 1 wherein the culture medium contains a member of the group consisting of kerosine, $C_{10}$ to $C_{25}$ aliphatics, and gasoline, and mixtures thereof as the hydrocarbon source of carbon.

3. The process of claim 1 wherein culturing is carried out at a temperature of 10 to 75° C. under substantially neutral pH conditions until significant qualities of L-phenylalanine are obtained.

References Cited

UNITED STATES PATENTS 3,222,258   12/1965   Iizuka et al. _____ 195—29

FOREIGN PATENTS 6,345   6/1962   Japan.

A. LOUIS MONACELL, Primary Examiner

J. R. HOFFMAN, Assistant Examiner